United States Patent [19]

Christensen

[11] E Re. 31,603

[45] Reissued Jun. 19, 1984

[54] BODY MASSAGE APPARATUS

[75] Inventor: Earl A. Christensen, San Carlos, Calif.

[73] Assignee: Andrew Electronics of Northern Calif., Inc., San Carlos, Calif.

[21] Appl. No.: 440,181

[22] Filed: Nov. 8, 1982

Related U.S. Patent Documents

Reissue of:

[64] Patent No.: 4,232,661
Issued: Nov. 11, 1980
Appl. No.: 875,984
Filed: Feb. 8, 1978

[51] Int. Cl.[3] ..... A61H 1/00

[52] U.S. Cl. ..... 128/33; 318/114; 318/129; 318/132

[58] Field of Search ..... 128/32, 33; 318/114, 318/119, 128, 127, 129, 132

[56] References Cited

U.S. PATENT DOCUMENTS

| | | | |
|---|---|---|---|
| 2,821,191 | 1/1958 | Pall | 128/33 |
| 2,844,777 | 7/1958 | Ross | 318/128 |
| 3,331,239 | 7/1967 | Larsen et al. | 318/132 |
| 3,335,717 | 8/1967 | Monaco | 128/33 |
| 3,446,204 | 5/1969 | Murphy | 128/33 |
| 3,872,526 | 3/1975 | Betts | 128/33 |
| 3,880,152 | 4/1975 | Nohmura | 128/33 |
| 3,922,589 | 11/1975 | Peckingham | 318/129 |
| 3,955,222 | 5/1976 | Pate | 128/33 |
| 4,105,024 | 8/1978 | Raffel | 128/33 |
| 4,371,815 | 2/1983 | Jones, Jr. et al. | 318/114 |

*Primary Examiner*—Richard J. Apley
*Assistant Examiner*—David J. Brown
*Attorney, Agent, or Firm*—C. Michael Zimmerman

[57] ABSTRACT

A vibrator motor is coupled to the frame of a body support structure to vibrate the latter. The motor is energized by a train of triangular pulses modulated by a triangular pulse signal having a lower frequency than that of the triangular pulse train.

22 Claims, 4 Drawing Figures

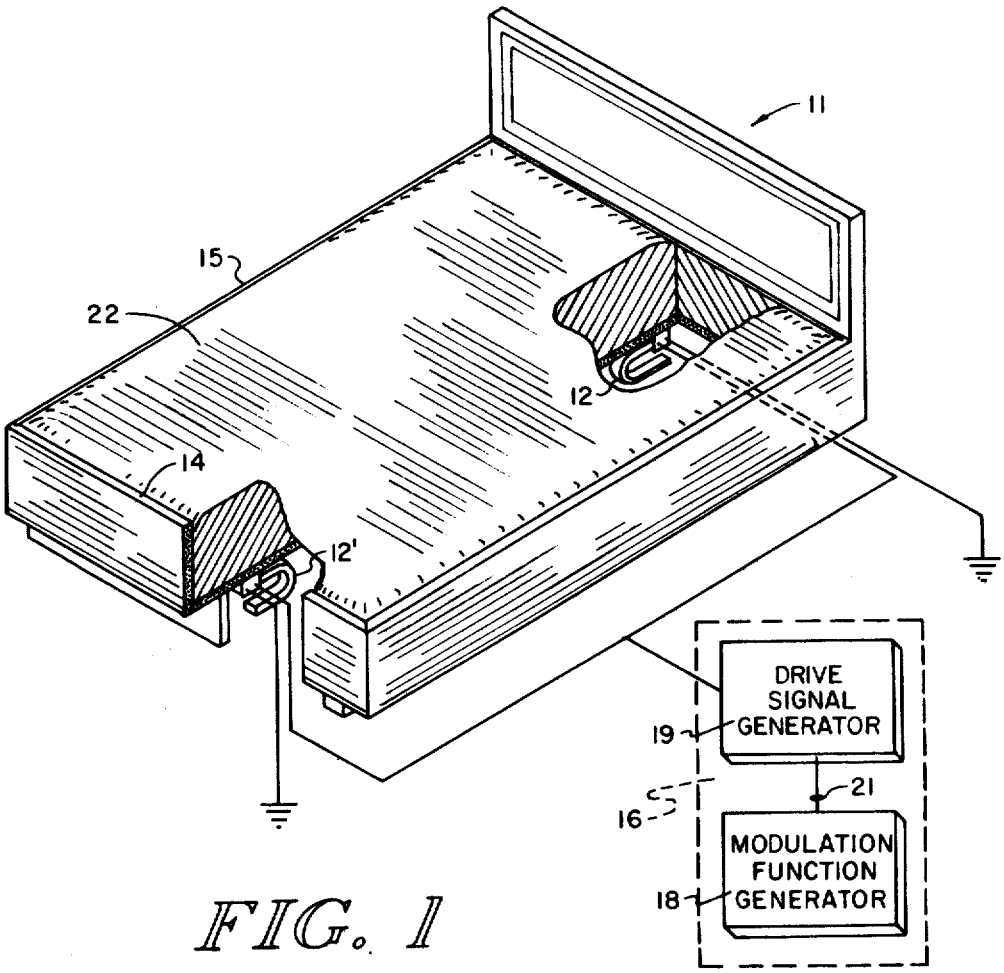
FIG. 1
FIG. 3
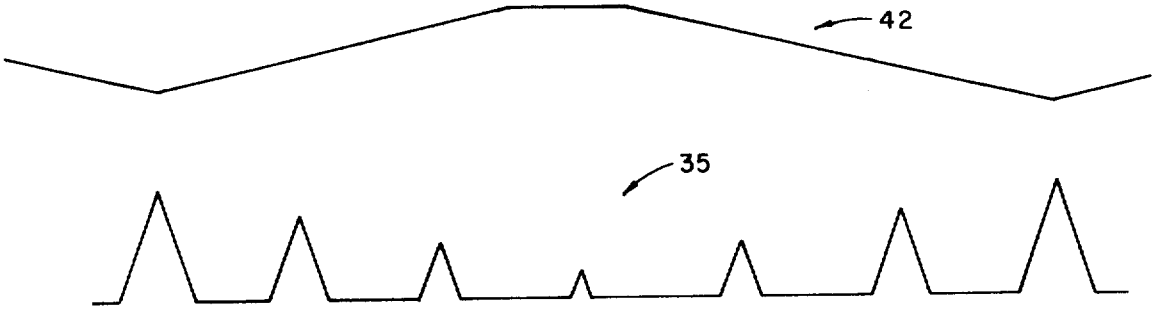

BODY MASSAGE APPARATUS

Matter enclosed in heavy brackets [ ] appears in the original patent but forms no part of this reissue specification; matter printed in italics indicates the additions made by reissue.

BACKGROUND OF THE INVENTION

This invention relates to body massage apparatus and, more particularly, to body massage apparatus for administering controlled massage actions to a person's body by vibrating a body support structure.

Two types of apparatus have heretofore been used for administering massage actions to a person's body by vibrating a body support structure. In the simplest of the two types of such apparatus, a motor is energized by a signal of constant frequency to vibrate the body support structure. The constant frequency of the motor energizing signal induces an unchanging vibration in the body support structure. The unchanging vibration transmits a concomitant unchanging vibratory effect to the occupant of the body support structure. While the unchanging vibration produces a rudimentary massaging effect, it is incapable of a varying stimulation of the body. Furthermore, some persons find an unchanging vibration to be disturbing rather than soothing. One example of a massage apparatus of the foregoing type is described in U.S. Pat. No. 3,050,051.

The second of the two types was resorted to in an attempt to obviate the aforementioned limitations and disadvantages. This second type uses wave interference to create a vibration pattern that travels about the body support structure. The traveling wave can transmit a continuously changing stimulation to occupants of the body support structure if the apparatus is operated to propagate the proper wave disturbance. To create a propagated wave disturbance, however, it is necessary to employ at least two vibrator motors to vibrate the body support structure at two different points selected so that the wave disturbance produced by each of the motors interacts with that produced by the other motor in the manner required to effect a traveling wave. This is achieved by utilizing at least two motor energizing signal sources and operating them to generate two signals slightly out of phase with respect to each other, so that the motors are driven at slightly different speeds. Examples of such apparatus are described in U.S. Pat. Nos. 3,019,785; 3,547,109 and 3,653,375.

SUMMARY OF THE INVENTION

The body massage apparatus of the invention includes a motor drive signal generating means which permits a single motor to impart a varying vibration to a body support structure for transmitting a varying stimulation to the body supported by the structure. Moreover, the body massage apparatus of the invention includes control means coupled to the motor drive signal generating means for selectively altering the amplitude versus time relationship of the motor energizing signal, whereby a wide variety of changing stimulations can be imparted to the supported body. Most desirably the control means automatically changes the amplitude versus time relationship of the motor energizing signal continuously so that a variety of continuously changing stimulations are imparted to the body. Furthermore, in one preferred embodiment of the body massage apparatus of the invention the control means and motor drive signal generating means cooperate to energize the vibrator motor with a series of changing amplitude pulses that transmit stimulation to the supported body that simulates stimulations created by traveling waves. Another advantageous feature of the body massage apparatus is that it preferably includes a signal generating means to generate a motor energizing pulse signal of selected amplitude versus time relationship, with pulses having gradually rising and falling edges.

The advantages of the foregoing and other features of the present invention will be described or become apparent from the following detailed description of a preferred embodiment.

BRIEF DESCRIPTION OF THE DRAWING

FIG. 1 is an illustration of a preferred embodiment of the body massage apparatus including a waterbed structure with parts broken away to show the mounting of vibrator motors;

FIG. 3 is a waveform diagram of signals generated by portions of the motor drive system illustrated in FIG. 2.

DETAILED DESCRIPTION OF THE PREFERRED EMBODIMENT

Figure 2:
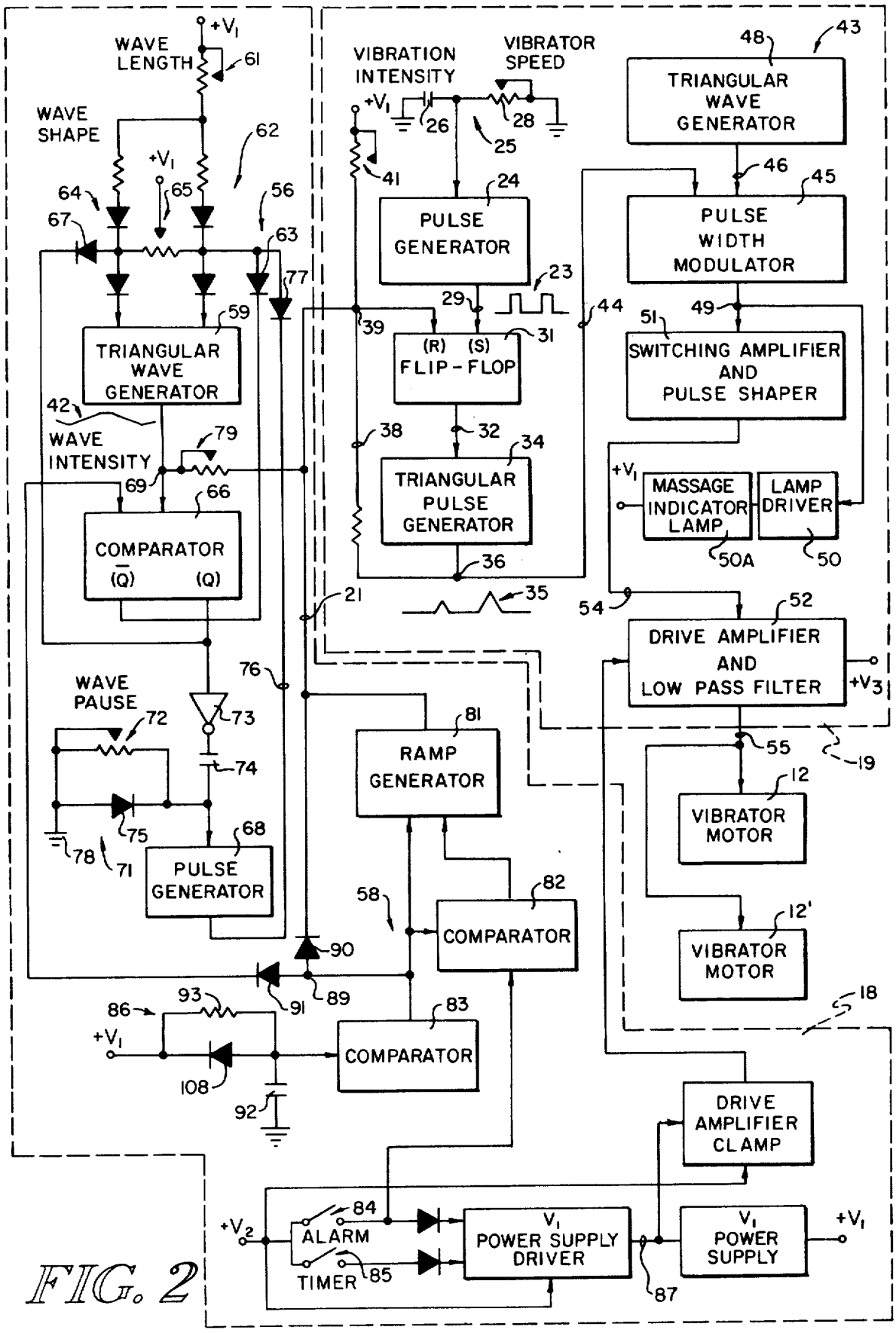
FIG. 2 is a schematic block diagram of a preferred embodiment of the motor drive system for use in the body massage apparatus illustrated in FIG. 1.

The body massage apparatus of the present invention selectively administers different massaging actions to a person's body by coupling a motor to vibrate a structure for supporting the body and energizing the motor with a motor drive signal whose waveform, i.e., amplitude versus time relationship, is selectively adjusted according to the particular massaging action desired.

Referring to FIG. 1, the body massage apparatus 11 of the present invention includes a motor 12 coupled to the frame 14 of a body support structure 15 so that vibrations are induced in the structure 15 when the motor 12 is energized. The motor energization or drive signal is generated by a motor drive system 16 that is electrically coupled to energize motor 12 to induce vibrations in the structure 15 in accordance with the waveform of the energizing motor drive signal. Vibrating the structure 15 establishes a wave pattern in the structure that transmits corresponding massaging actions to the occupant. The wave pattern established in the vibrated structure 15 and, hence, the massaging action received by the occupant, is varied by changing the waveform of the motor drive signal applied to the motor 12. In the massage apparatus of the present invention, the wave pattern is varied selectively to produce different massaging actions by selectively varying the magnitude, duration, duty cycle, frequency, shape or other amplitude versus time characteristics of the waveform of the motor drive signal provided by the motor drive system 16. A single vibrator motor 12 energized by such a motor drive signal can produce the varying massaging actions. However, in one preferred embodiment constructed from the components identified hereinbelow, more efficient transmission of massaging action is achieved by vibrating the body support structure 15 with two vibrator motors 12 and 12' energized by a single motor drive system 16 that is controllable to provide a changing motor drive signal waveform. In embodiments of the massage apparatus 11 utilizing more than one motor, the wave pattern established within the body support structure 15 and, hence, massaging actions, can also be changed by energizing different motors with signals of different waveforms or with signals having the same waveform but of different phases. Typically, each motor in such embodiments is energized by a separate controllable motor drive system 16.

A particularly advantageous feature of the preferred embodiment of the massage apparatus 11 is that the motor drive system 16 automatically generates a continuously changing motor drive signal waveform which when applied to the vibrator motor 12 results in administering a continuously changing massaging action to the occupant of the body support structure 15. To this end, the motor drive system 16 includes a modulation function generator 18 that generates a modulating signal for varying the motor drive signal waveform generated by the signal generator 19. Preferably, the function generator 18 is controllable so that modulating signals of different waveforms can be selected. The selected modulating signal is coupled by line 21 extending from the output of the function generator 18 to the modulation control input of the signal generator 19. The modulating signal causes the signal generator 19 to generate a signal whose amplitude versus time relationship varies in accordance with that of the modulating signal, thereby resulting in the automatic generation of a motor drive signal having a waveform that continuously varies at the frequency of the modulating signal.

Usually, the various massaging actions are produced by selecting a modulating signal frequency that is much less than the frequency of the unmodulated or carrier signal generated by the signal generator 19. However, when the modulating signal frequency is of the same order as or greater than the frequency of the carrier signal, the signals interact to produce a motor drive signal that also results in the administering of a stimulating massaging action.

Massage apparatus 11 can utilize various body support structures 15 for transmitting the massaging action of induced vibrations to the occupant. Chairs, couches, beds and the like are examples of support structures suitable for use in the massage apparatus. A waterbed is shown in FIG. 1 serving as the massage transmitting structure 15. Two electromagnetic motors 12 and 12' capable of being driven by pulse type drive signals, such as the vibrator motor manufactured by Allied Transformer Company, and identified by the device number 201-40V are fastened to the platform of a waterbed frame 14 at head and foot of the waterbed structure 15. As stated hereinbefore, a single motor 12 can be employed to induce the necessary vibrations in the waterbed structure to administer the desired massaging actions to the occupant. Furthermore, more than one motor drive system 16 can be employed when two or more vibrator motors are used if additional variations in massaging action are desired. The massaging actions are administered by the body cushion or waterbed mattress 22 supported in intimate contact with the frame 14 in accordance with the waveform (or waveforms) generated for energizing one or more of the motors 12 and 12'. The mattress 22 commonly includes a bladder made of an inelastic flexible substance which is filled with water or other fluid or yieldable substance. Vibrations induced in the waterbed frame 14 agitate the waterfilled bladder or mattress 22 to create corresponding wave actions in the mattress that transmit the massaging action to the occupant.

Referring now to FIG. 2, a preferred embodiment of the motor drive system 16 of the massage apparatus 11 is illustrated. This embodiment includes a pulse type signal generator 19 that is controllable to generate a variety of pulse signal waveforms or trains for energizing the vibrator motors 12 and 12'. Sinusoidal, rectangular, sawtooth, triangular and other shapes of pulses can be employed to form the motor drive signal. In the preferred embodiment of the motor drive system 16 illustrated by FIG. 2, a triangularly shaped pulse motor drive signal is generated for energizing the motors 12 and 12'. The use of triangularly shaped pulses to drive the motors has several advantages not achievable when other pulse shapes are used. Triangularly shaped pulses are characterized by leading and trailing edges that gradually change in opposite directions, i.e., gradually rising and falling edges, resulting in a smooth, transient free motor operation similar to that obtained when sinusoidal pulse signals are employed. Pulse shapes with rapidly changing edges, such as found in rectangular and sawtooth pulses, produce unwanted transient effects in the motor operation. In addition, using triangularly shaped pulses to drive the motors 12 and 12' permits readily available inexpensive and simple integrated circuit (IC) components to be used in the construction of the motor drive system 16 instead of the more complex and expensive sinusoidal function generators.

The triangular pulse signal generator 19 includes a pulse generator 24 that generates a train of narrow positive rectangular or trigger pulses 23 at a selected pulse repetition rate in the range of 0.5 Hz to 70 Hz. As will be described further hereinbelow, the pulse repetition rate of the train of pulses provided by pulse generator 24 determines the triangular pulse frequency of the motor drive signal. An adjustable RC frequency determining network 25 connected in the input circuit of the pulse generator 24 determines the pulse repetition rate of the pulse train. The RC network 25 is connected in circuit with the pulse generator 24 so that the network's capacitor 26 is rapidly charged by the pulse generator 24 when its output goes to a high logic signal level. The capacitor 26 is then slowly discharged by potentiometer 28, returning the output of the pulse generator 24 to a low logic signal level, thereby forming the narrow positive trigger pulse 23. By adjusting the potentiometer 28 to insert less resistance in the RC network 25, the discharge time of the network's capacitor 26 is decreased, thereby increasing the pulse repetition rate of the train of positive pulses provided by the generator 24. The duration of the pulses 23 provided by the pulse generator 24 is determined by the time required to charge the capacitor 26 and, since the pulses are utilized as trigger pulses in following circuits of the triangular pulse signal generator 19, they need not be of long duration. In the preferred embodiment, the positive pulses 23 provided by the pulse generator 24 have a duration of about 0.5 m sec.

The positive pulses 23 at the output of the pulse generator 24 are coupled by line 29 to the set control input, (S), of a bistable multivibrator of flip-flop 21. Each time the flip-flop 31 receives a positive pulse 23 at its set control input, the flip-flop is set in its stable state that places a high logic signal level at its output coupled to line 32. This line extends to a ramp direction control input of a bi-directional ramp generating circuit or triangular pulse generator 34, which is controlled by the logic level on the line 32 to generate triangularly shaped pulses. The triangular pulse generator 34 responds to a high logic signal level present on line 32 by causing its output connected to junction 36 to change gradually in a first direction, which direction is positive in the preferred embodiment. When an opposite or low logic signal level is present on line 32, the triangular pulse generator 34 responds by causing its output to change gradually in a second opposite direction (negative direction in the preferred embodiment). Control of the generation of the triangularly shaped pulses is advantageously accomplished in the motor drive system by coupling the reset control input, (R), of the flip-flop 31 by a line 38 to the output of the triangular pulse generator 34. With the flip-flop 31 and triangular pulse generator 34 coupled together in this manner, the flip-flop functions as a control circuit means with each positive pulse 23 received from the pulse generator 24 at the set input, (S), of the flip-flop first placing the flip-flop and the triangular pulse generator in respective operating states to cause the output at junction 36 to changed gradually in the positive direction until it reaches a level that will activate the resetting of the flip-flop 31. When the output of the triangular pulse generator 34 reaches the level corresponding to the reset activating point of the flip-flop 31, the operating state of the flip-flop changes to place a low logic signal level on line 32 extending to the input of the triangular pulse generator 34.

As described above, a low logic signal level on line 32 places the triangular pulse generator 34 in an operating state causing the output at junction 36 to change gradually in the negative direction, which completes the formation of a triangular pulse. Thus, a train of narrow positive trigger pulses 23 placed on line 29 by the pulse generator 24 results in the generation of a corresponding train of triangular pulses at junction 36.

The triangular pulse generator 34 of the preferred embodiment generates triangular pulses with identical rise and fall times. Nominally, 14 msec triangular pulses are generated having 7 msec rise and fall times regardless of the frequency of the triangular pulse train. However, the amplitude or duration of the triangular pulses can be varied by changing the bias applied to the reset control input, (R), of the flip-flop 31. The bias can be changed by changing the fixed bias coupled to the reset input, or by modulating the bias with a signal that varies with time. As will be described below, the modulation function generator 18 is coupled by line 21 to the reset input (R) via a control terminal at junction 39 to modulate the bias of the reset input with a signal that varies with time. Regardless of how the bias is changed, if the bias at junction 39 is decreased by, for example, adjusting the vibration intensity potentiometer 41 to insert more resistance between the junction 39 and the positive $V_1$ supply, the leading edge of the triangular pulse generated by the triangular pulse generator 34 must rise to a higher level to activate the resetting of the flip-flop 31. This has the effect of increasing the amplitude and duration of the triangular pulses. If the bias at the junction 39 is increased by adjusting the vibration intensity potentiometer 41 to insert less resistance between the junction 39 and the positive $V_1$ supply, a lower amplitude triangular pulse will reset the flip-flop 31. Under these conditions, the amplitude and duration of the triangular pulses are decreased. Various circuit means can be employed to adjust the bias at junction 39 and, thereby, determine the amplitude and width of the triangular pulses 35. However, by utilizing the modulation function generator 18 to modulate the bias applied to the reset input with a signal whose amplitude varies (i.e., increases and decreases) with time, a triangular pulse train is generated composed of pulses whose amplitude and duration varies correspondingly with time this is represented by the triangular pulse train 35 shown in FIG. 3. As described above, a wide range of stimulating massaging effects can be administered by energizing a single vibrator motor 12 with a motor drive signal having such an amplitude versus time relationship. In the preferred embodiment, a motor drive signal having a changing amplitude versus time relationship is obtained by generating an amplitude varying modulating signal and coupling it to junction 39 to modulate the bias of the reset input (R) of the flip-flop 31. The modulating signal at junction 39 causes the flip-flop 31 and triangular pulse generator 34 to generate triangular pulses whose amplitude versus time relationship varies at the frequency of the modulating signal. The waveform diagram of FIG. 3 exemplifies the effect on the generation of the triangular pulses of modulating the reset input (R) of the flip-flop 31 with an amplitude varying modulating signal. As discussed hereinbefore, the frequency of the modulating signal generally is much less than the frequency of the pulses provided by the pulse generator 24 and, preferably, is set to be a few orders of magnitude less. However, if desired, the frequency of the modulating signal can be adjusted to be on the order of or greater than the frequency of the pulses provided by the pulse generator 24. In the preferred embodiment, the frequency of the modulating signal is nominally adjustable over the range of about 0.1 Hz to 15 Hz. However, embodiments of the motor drive system 16 provided with pause control, one of which is described below, can provide modulating signals at frequencies well below the above specified 0.1 Hz.

In the preferred embodiment, integrated circuit components are employed to construct the circuits for generating the modulated triangular pulses. Inexpensive integrated circuit components operate at moderate and low voltage and power levels that are inadequate to drive electromagnetic pulse motors of the kind described above. To provide triangular pulses at the voltage and power levels required to drive the motors 12 and 12', a voltage and power transformation circuit 43 is coupled to receive the triangular pulses provided at the junction 36 and transform them to corresponding higher voltage triangular pulses at a higher power level. More specifically, in the preferred embodiment a conventional voltage and power transformation circuit 43 is used which includes a pulse width modulator 45 having one of its inputs coupled by a line 44 to the output of the triangular pulse generator 34. A voltage comparator type pulse width modulator is used, which compares the voltage level of the modulating signal with that of a higher frequency triangular wave carrier signal generated by a triangular wave generator 48 coupled to a second input of the modulator 45 by a line 46. Modulator 45 generates a pulse train at the pulse repetition rate of the carrier signal, with the width of the pulses varying in accordance with the amplitude of the pulses emanating from modulating triangular wave generator 34. In the preferred embodiment, the triangular wave generator 48 is constructed to generate a 20 KHz triangular wave carrier signal. As the amplitude of the triangular wave carrier signal varies with time, the output of the pulse width modulator 45 on line 49 changes state between high and low voltage levels whenever the amplitude of the carrier signal on line 46 crosses the amplitude of the modulating triangular pulse signal on line 44. In the preferred embodiment, line 49 is at a low logic level when the amplitude of the triangular wave carrier signal is greater than that of the modulating triangular pulse signal and is at a high logic level when it is less than that of the modulating signal. Therefore, the signal generated by the pulse width modulator 45 on line 49 is a pulse width modulated signal in the form of a train of positive rectangular pulses having a pulse width directly proportional to the amplitude of the triangular pulse signal present on line 44.

The pulse width modulated signal on line 49 is coupled to a lamp driver circuit 50 which in turn is coupled to a massage indicator lamp 50A to drive the latter. While the lamp driving signal is pulse width modulated, the repetition rate of the pulses is so fast that the resulting high frequency flashes are not visually detectable. Changes in the perceived intensity of the lamp will generally correspond to changes in the massaging effect imparted to the waterbed structure by the electromagnetic pulse motors 12 and 12'. Thus, lamp 50A provides for the user of the apparatus an indication of the massaging effect. It should be noted that the insertion of such an indicator lamp at this location assures that the lamp will receive sufficient voltage levels for operation even during low intensity massaging action.

The pulse width modulated signal generated by the modulator 45 is a low level signal like the triangular pulse signal. However, the rectangular form of the pulse width modulated signal is a more convenient form for the voltage and power transformation used to obtain a more suitable motor drive signal for driving electromagnetic pulse motors of the kind described above. The desired voltage and power gains are obtained through the cooperation of a switching amplifier and pulse shaper 51 and following drive amplifier and low pass filter circuitry 52. The switching amplifier and pulse shaper 51 has its input coupled to receive the pulse width modulated signal placed on line 49 by the modulator 45. The low level pulse width modulated signal on line 49 is converted by the amplifier and shaper 51 to a high voltage level pulse width modulated signal without distorting the pulses of the signal. This high voltage level signal is coupled by a line 54 to the input of the drive amplifier and low pass filter circuitry 52, which provides the necessary power gain for driving the electromagnetic pulse motors in the desired manner. The low pass filter included in the circuitry 52 removes the modulating triangular pulse signal from the 20 KHz carrier signal after the desired voltage and power gain has been obtained. The removed triangular pulse signal is output by the circuitry 52 on the output line 55 of the motor drive system 16. One or more electromagnetic pulse motors 12 and 12' used to induce vibrations in the waterbed structure 15 and transmit massaging effects to the occupant are coupled to the output line 55 to be energized in accordance with the triangular pulse signal generated by the motor drive system 16.

The waveform signal generator 19 can be operated alone or together with the modulation function generator 18 to provide triangular pulse signals of various amplitude versus time relationships for administering different massaging effects. When used alone, triangular pulse signals of different pulse frequencies, amplitudes, durations and duty cycles can be generated by adjusting the vibrator speed potentiometer 28 and vibration intensity potentiometer 41. This permits differing massaging effects to be administered to the occupant of the structure 15 vibrated by one or more motors energized by a signal generated by the use of only the waveform signal generator 19. However, with the potentiometers adjusted to desired settings, a train of uniform triangular pulses are generated. Using the modulation function generator 18 in combination with the waveform signal generator 19 enables the generation of a variety of trains of amplitude and duration varying triangular pulses for energizing motors 12 and 12', whereby a greater variety of differing massaging effects can selectively be administered. In one embodiment of the modulation function generator 18 and waveform signal generator 19 combination to be described below, the amplitude and duration of the motor energizing signal is continuously varied whereby massage stimulations are transmitted to the occupant of the body support structure 15 that simulate a traveling wave stimulation.

The modulation function generator 18 of the embodiment illustrated by FIG. 2 includes a signal generator 56 and a timing control circuit 58. The timing control circuit 58 provides timing control for the operation of both the modulation function generator 18 and waveform signal generator 19 and will be described further hereinbelow. To modulate the bias of the reset input (R) of the flip-flop 31 with an amplitude varying signal, a triangular wave generator 59 is coupled by the line 21 to the junction 39. The frequency of the triangular wave 42 generated by the generator 59 is controlled by a wavelength potentiometer 61 included in the frequency determining circuit of the generator 59. In one embodiment of the modulation function generator 18, an integrating circuit with controlled bi-directional charging of the integrating capacitor is employed in the generator 59 to effect the generation of the triangular wave modulating signal. Charging of the integrating capacitor is controlled by the amount of current provided to the input of the generator 59 and alternately enabling the two inputs of the generator 59 to receive the provided current. Charging current provided by the positive $V_1$ source is coupled to the inputs of the generator 59 by the two series connected resistors and diode gate circuits 62 and 64. The wave length potentiometer 61 connected between the positive $V_1$ source and gate circuits controls the amount of current provided to the inputs of the generator 59 and, thereby, the rate of charging the integrating capacitor, hence, frequency of the generated triangular wave. Adjusting the wave length potentiometer 61 to insert less resistance between the positive $V_1$ supply and the two inputs to the generator 59 increases the current provided to the integrating capacitor, thereby increasing the frequency of the generated triangular wave modulating signal. Adjusting the potentiometer 61 to insert more resistance decreases the charging current and, therefore, the frequency of the generated modulating signal.

Altering the frequency of the triangular wave modulating signal correspondingly alters the frequency of the amplitude and duration variations of the triangular pulse signal. For the preferred embodiment discussed above, the wave length potentiometer 61 is selected to permit adjustment of the modulating signal frequency over the range of about 0.1 Hz to 15 Hz.

The rising leading edge of the triangular wave modulating signal is produced by the generator 59 by enabling the gate circuit 64 to deliver current to the input of the generator 59. The falling trailing edge of the triangular wave modulating signal is produced when the gate circuit 62 is enabled to deliver current to the other input of the generator 59. The gate circuits 62 and 64 are controlled by a comparator 66 having one of its inputs coupled to the output of the triangular wave generator 59 and its complementary outputs Q and $\overline{Q}$, respectively, coupled to the gate circuits 62 and 64. During the rising edge of the triangular wave modulating signal, the $\overline{Q}$ output is at a low logic level, which enables the diode gate 63 of the gate circuit 62. The complementary high logic level at the Q output of the comparator 66 disables the diode gate 67 of the gate circuit 64. Enabling of the diode gate 63 diverts current from input of the triangular wave generator 59 connected to the gate circuit 62. This clamps the generator 59 in the state that causes current to be provided to the integrating capacitor in the direction that produces a gradually rising signal at the output 69 of the generator 59. When the rising leading edge of the triangular wave modulating signal reaches a level corresponding to a reference level of the comparator 66, the states of the Q and $\overline{Q}$ outputs switch, the Q output going to a low logic level. The low logic level at the Q output of the comparator 66 enables the diode gate 67 of the gate circuit 64 while the complementary high logic level at the $\overline{Q}$ output removes the enabling signal from the diode gate 63. This results in the diversion of current from the input of the triangular wave generator 59 connected to the gate circuit 64, thus clamping the generator 59 in the state that causes current to be provided to the integrating capacitor in the direction that produces a gradually falling signal at the output 69 of the generator 59. The signal level at the output 69 gradually falls until it reaches a level corresponding to another level of the comparator 66, at which point the comparator 66 switches the states of its Q and $\overline{Q}$ outputs to repeat the generation of the rising and falling edges forming the triangular wave modulating signal. In this manner, the triangular wave generator 59, comparator 66 and gate circuits 62 and 64 cooperate to provide continuously the triangular wave modulating signal.

The triangular wave generator 59 is also provided with means to introduce a difference between the charge and discharge times of the integrating capacitor whereby unsymmetrical modulating signal waveforms can be obtained. More particularly, a wave shape potentiometer 65 is connected across the two inputs to the triangular wave generator 59 and has its wiper arm connected to the positive $V_1$ supply. With the wiper arm adjusted to the middle of the potentiometer 65, a symmetrical triangular wave modulating signal is generated. Positioning the wiper arm closer to the series connected resistor and diode of the gate circuit 62 increases the current provided to the input of the generator 59 during the falling traveling edge interval of the triangular wave modulating signal relative to that provided during the rising leading edge interval. Hence, the generated triangular wave modulating signal is unsymmetrical with the gradually rising leading edge of longer duration than the falling trailing edge. Positioning the wiper arm of the potentiometer 65 closer to the series connected resistor and diode of the gate 64 increases the current provided during the rising leading edge interval relative to that provided during the falling trailing edge interval. Under these conditions, the unsymmetrical triangular wave modulating signal that is generated has a leading edge that is shorter in duration than the trailing edge.

Modulating the bias of the reset input (R) of the flip-flop 31 with an unsymmetrical triangular wave signal causes the amplitude and duration of the triangular pulses to increase and decrease at different rates. With reference to FIG. 3, it can be seen that shortening the duration of the rising edge of the modulating signal relative to that of the signal's falling edge (accomplished by positioning the wiper arm of the potentiometer 65 closer to the series resistor and diode of the gate circuit 64) increases the rate at which the amplitude and duration of the triangular pulses are decreased and decreases the rate at which they are increased. The opposite effect is achieved by shortening the duration of the falling edge of the modulating signal relative to that of the signal's rising edge (accomplished by positioning the wiper arm closer to the series resistor and diode of the gate circuit 62), i.e., decrease of the rate at which the amplitude and duration of the triangular pulses are decreased and increase of the rate at which they are increased.

The signal generator 56 further includes a pulse generator 68 arranged in circuit with the comparator 66 and triangular wave generator 59 for altering the shape of the waveform of the modulating signal. The pulse generator 68 is coupled in circuit with an adjustable RC network 71 and the gate circuit 62 providing current to the input of the triangular wave generator 59 during the falling trailing edge interval of the triangular wave modulating signal to delay temporarily the generation of the falling trailing edge. The interval of the delay is determined by the setting of the wave pause potentiometer 72 included in the RC network 71. Temporarily delaying the generation of the falling trailing edge of the triangular wave modulating signal results in the truncation and concomitant change in the frequency of the triangular wave modulation signal, with the truncation occurring at the level corresponding to a fully charged integrating capacitor. Such a truncated modulating signal is represented in FIGS. 2 and 3 by waveform 42. In the preferred embodiment, truncation occurs at the positive peak of the modulating signal. This maintains the bias of the reset input (R) of the flip-flop 31 of the waveform signal generator 19 at a higher level for the delay interval, causing the triangular pulse generator 34 to generate smaller amplitude triangularly shaped pulses for the interval. The temporary delay of the generation of the falling trailing edge of the triangular wave modulating signal is accomplished by coupling the Q output of the comparator 66 through an inverter 73 to one side of the capacitor 74 of the adjustable RC timing network 71. The other side of the capacitor 74 is coupled to the parallel connected wave pause potentiometer 72 and diode 75 and to the input of the pulse generator 68. At the initiation of the rising leading edge of the triangular wave modulating signal, the Q output of the comparator 66 is switched to a high logic signal level. This high logic level is coupled to inverter 73 which places a low logic level on capacitor 74. Because of such low logic signal level on capacitor 74, pulse generator 68 (also an inverter) is caused to place a high logic signal level on its output coupled by line 76 to the diode gate 77 of the gate circuit 62 connected to the input of the triangular wave generator 59. The high logic level placed on line 76 by the pulse generator 68 disables the diode gate 77. In addition, when the output of the comparator 66 coupled to the pulse generator 68 is switched to a high logic signal level, the diode 75 is enabled by the low logic level output provided by the inverter 73. The enabled diode 75 allows the capacitor 74 to be rapidly discharged. Discharging the capacitor 74 prepares it for timing the duration of the pause to be inserted by the operation of the pulse generator 68 between the rising and falling edges of the triangular wave modulating signal.

When the amplitude of the rising leading edge of the triangular wave modulating signal reaches the positive peak determined by the reference level provided for the comparator 66, the Q output of the comparator is switched low and the output of the following inverter 73 coupled to the capacitor 74 is responsively switched from the low to a high logic signal level. Initially, the low-to-high logic signal level change is reflected across the wave pause potentiometer 72 and causes the pulse generator 68 to place a low logic signal level on its output coupled to line 76. A low logic signal level on the line 76 enables the diode gate 77 to divert current from the input of the triangular wave generator 59 so that the integrating capacitor does not receive current that produces the falling trailing edge of the triangular wave modulating signal. The high logic signal level at the output of the inverter 73 permits the capacitor 74 to be charged through the wave pause potentiometer 72. As the capacitor 74 charges, the voltage across the potentiometer 72 decreases, eventually reaching a level that activates the pulse generator 68 to return its output to a high logic signal level which disables the diode gate 77 and permits current to be provided to the input of the triangular wave generator 59 through the gate circuit 62 so that the falling trailing edge of the triangular wave modulating signal can be produced. In this manner, the pulse generator 68 provides a low logic signal level or negative pulse on the line 76 that enable the diode gate 77 to prevent triangular wave generator 59 from forming the falling trailing edge of the triangular wave modulating signal until the capacitor 74 is charged. The time required to charge the capacitor 74, hence, the delay of the discharge of the integrating capacitor of the generator 59, can be changed by adjusting the wave pause potentiometer 72 to change the time constant of the charging path. The time constant of the charge path is determined by the resistance inserted between the capacitor 74 and ground 78 by the wave pause potentiometer 72. Adjusting the wiper arm of the potentiometer 72 to insert more resistance in the charge path increases the time constant, hence the time that the output of the pulse generator 68 is held at a low logic level after the triangular wave modulating signal reaches its positive peak. In the preferred embodiment, the wave pause potentiometer 72 is adjustable over a range that produces a delay in the charging of the capacitor 74 and, therefore, the generation of the falling trailing edge of the triangular wave modulating signal by the triangular wave generator 59 of about 5 msec to 15 seconds.

An additional advantage can be gained from the use of the preferred embodiment pulse generator 68 to delay the generation of the falling trailing edge of the triangular wave modulating signal. This delay will result in the final pulse train directed to the vibrators being held at a reduced intensity for a perceptible period of time.

The triangular wave modulating signal generated by the signal generator 59 portion of the modulation function generator 18 is coupled to the reset input (R) of the flip-flop 31 through the wave intensity or amplitude determining potentiometer 79. The wave intensity potentiometer 79 is adjustable to control the effect the modulating signal has on the bias of the reset input (R). Adjusting the potentiometer 79 to insert less resistance between junctions 39 and 69 increases the range of bias variation produced at the reset input (R) of the flip-flop 31 by the modulating signal, hence, the range of amplitudes at which the output of the triangular pulse generator 34 activates the resetting of the flip-flop 31. Thus, less resistance inserted between junctions 39 and 69 increases the range of the variation in the amplitude and duration of the triangular pulses generated by the triangular pulse generator 34 as the triangular wave modulating signal modulates the reset input (R) of the flip-flop 31.

Automatic on/off control by a clock or other timing mechanism is made possible by the timing or clock control circuit 58, which includes a ramp signal generator 81 and a pair of comparators 82 and 83. The ramp signal generator 81 and pair of comparators 82 and 83 are operatively associated with an alarm switch 84, timer switch 85, timing circuit 86 and power supply $V_1$ to provide preset and timing signals for automatically timed on/off control of the motor drive system 16. With both the alarm switch 84 and timer switch 85 open, the motor drive system 16 does not receive operating power from $V_1$ and $V_2$ supplies and is disabled. When the timer switch 85 is closed, the positive $V_2$ supply is coupled by line 87 to activate the power supply $V_1$. This permits the necessary driving signals to be provided to the motor drive system 16. The comparator 83 initially provides a high logic signal level on its output at junction 89. The high logic signal level at junction 89 is coupled by diode gates 90 and 91 to the reset terminal (R) of the flip-flop 31 and a second input of the comparator 66. The high logic signal level presents the flip-flop 31 in its reset state and presets the comparator 66 so that a low logic signal level is placed on its $\overline{Q}$ output which causes the output of triangular wave generator 59 at junction 69 to go to a high level. The high logic signal level at junction 89 clamps the flip-flop 31 and comparator 66 in the aforedescribed states for the duration of the high logic signal level.

The output of the comparator 83 is coupled to the inputs of the ramp generator 81 and of the comparator 82. As long as the alarm switch 84 is open, the output of the comparator 82 is the complement of the output of the comparator 83. The output of the comparator 82 extends to a second input of the ramp generator 81. The second input is coupled to the ramp forming circuit of the ramp generator 81 for controlling the duration of the negative going ramp. With a high logic signal level at the output of the comparator 83, the comparator 82 has a low logic signal level at its output coupled to the ramp forming circuit input of the ramp generator 81. With the comparators 82 and 83 in the aforedescribed logic states, the output of the ramp generator 81 rapidly rises to a high logic signal level. The output of the ramp generator 81 is coupled to line 21 which extends to the reset input (R) of the flip-flop 31. As long as the output of the ramp generator 81 is at its high logic signal level, the bias of the reset input (R) of the flip-flop 31 is at a level that keeps the flip-flop 31 in its reset state that places a low logic signal level on line 32 except when a trigger pulse 23 is present at the set input (S). During the interval of each trigger pulse 23, the flip-flop 31 is placed in a state that enables a small amplitude triangular pulse to be generated by the triangular pulse generator 34, but the amplitude is so small that no noticeable stimulation is transmitted to the occupant of the body support structure. Hence, such effects can be ignored in the further description of the invention. As described above, a low logic signal level on line 32 causes the output of the triangular pulse generator 34 to seek a low or negative level (except for the short intervals of the trigger pulses 23). Therefore, keeping the flip-flop 31 in its reset state prevents the triangular pulse generator 34 from generating triangular pulses at a magnitude that produces noticeable vibrating stimulations to the occupant of the body support structure. When the signal level at the output of the ramp generator 81 is less than its high logic signal level, the bias of the reset input (R) of the flip-flop 31 is at a level that permits the flip-flop to be switched between its set and reset states for sufficient intervals that allow the triangular pulse generator 34 to generate pulses of an amplitude and duration that results in the transmission of noticeable vibrating stimulations to the occupant of the body support structure 15.

The ramp generator 81 is controlled by the two logic signal levels at the outputs of the comparators 82 and 83. When timing switch 85 is closed, the capacitor 92 of the timing circuit 86 charges through the resistor 93 towards the positive $V_1$ supply while the output of the comparator 83 remains at a high logic signal level. When the capacitor 92 charges to a level corresponding to the reference level of the comparator 83, the output of the comparator is switched to a low logic signal level. This causes the output of the following comparator 82 to be switched to a high logic signal level. With the two outputs of the comparator 82 and 83 at these logic signal levels, the output of the ramp generator 81 is permitted to rapidly ramp negatively from the high logic signal level to a low logic signal level. The high logic signal level at the output of the comparator 82 provides a short time constant for the negative ramp forming circuit of the ramp generator 81 to enable its output to ramp towards the low logic signal level. This removes the bias provided by the ramp generator 81 to the reset input (R) of the flip-flop 31 and permits the flip-flop to be switched between its set and reset states for sufficient intervals whereby triangular pulses can be generated of amplitudes and durations that produce noticeable stimulations to the occupant of the body support structure 15.

The time constant of the timing circuit 86 is selected so that the output of the ramp generator 81 remains at a high logic signal level for an interval of about 5 seconds. As long as the timer switch 85 remains closed after the 5 second interval, triangular pulses are provided by the triangular pulse generator 34 that transmit a massaging action to the occupant of the body support structure. When the timer switch 85 is opened, for example, at a preselected time by a clock on other time controlled switch activating means, the operating power provided by the $V_1$ and $V_2$ supplies is removed from the motor drive system 16 to disable it.

If the alarm switch 84 is closed instead of the timer switch 85, the operation of the clock control circuit 58 is the same as described above when the timer switch 85 is closed with one significant difference. The alarm switch 84 couples the positive $V_2$ supply to the comparator 82 to hold it in a state that keeps its output coupled to the ramp generator 81 at a low logic signal level. Consequently, when the capacitor 92 of the timing circuit 86 charges to the level that causes the output of the comparator 83 to be switched to a low logic signal, the output of the ramp generator 81 is permitted to ramp negatively to a low logic level. However, because the output of comparator 82 is held at a low logic signal level, the time constant of the negative ramp forming circuit of the ramp generator is long. With both outputs of the comparators 82 and 83 at a low logic signal level, the ramp generator 81 is enabled to gradually decrease the signal level at its output coupled to line 21. In a preferred embodiment, the ramp generator 81 is constructed to gradually decrease its output over an interval of about 7 minutes. As the output of the ramp generator 81 gradually decreases, the triangular pulse generator 34 of the signal generator 19 generates a train of pulses whose amplitude and duration gradually increase, while being modulated by modulating signal 42 provided by the signal generator 56. A timing control 58 with this feature enables a gradually increasing massaging effect to be administered to an occupant of a waterbed structure 15, to, for example, wake the occupant.

Figure 4:
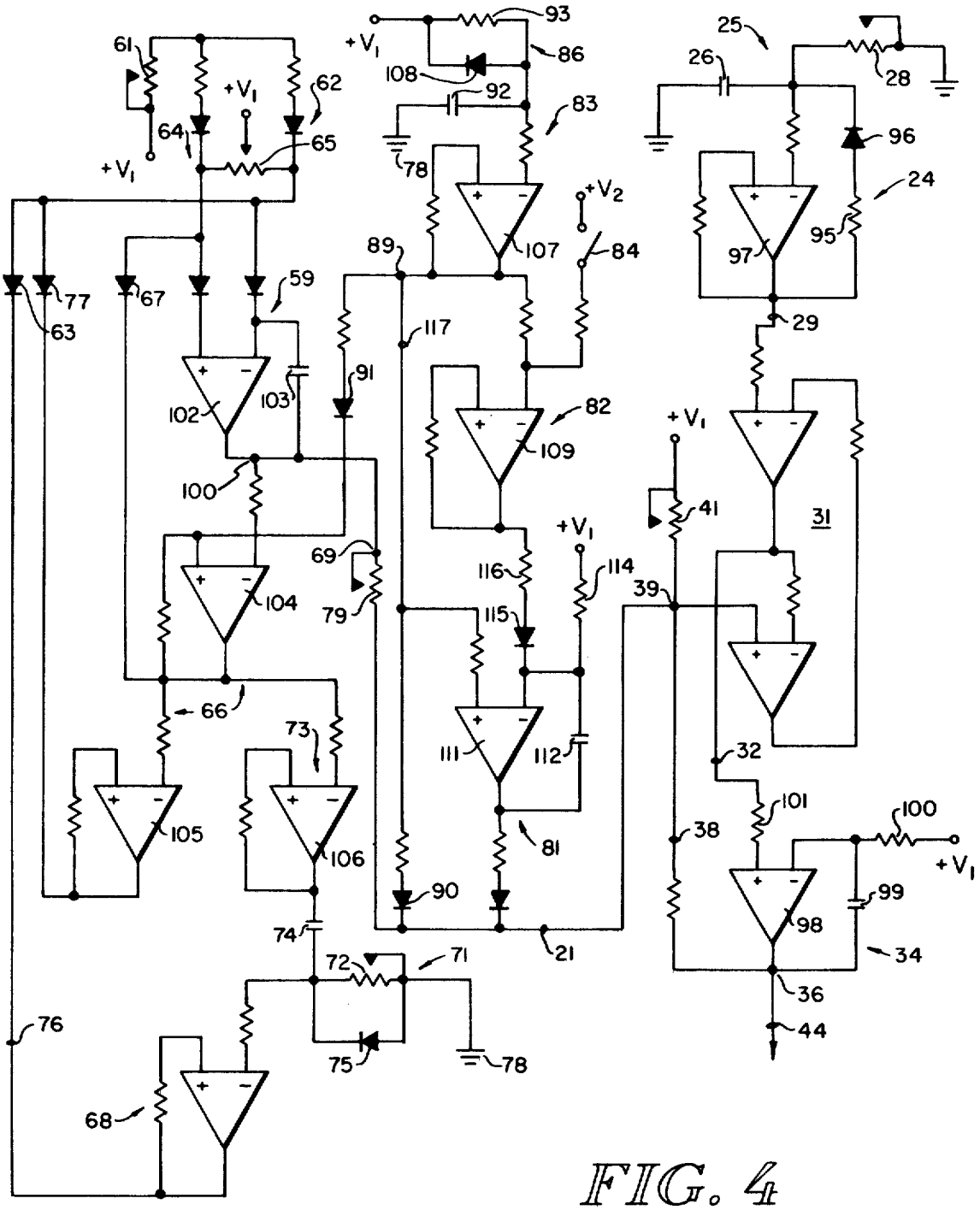
FIG. 4 is a preferred schematic circuit diagram of the embodiment of the motor drive system illustrated in FIG. 2.

A schematic diagram of a preferred embodiment of part of the motor drive system 16 that generates modulated triangular pulses is illustrated in FIG. 4. The illustrated part includes the entire modulation function generator 18 and the triangular pulse generating part of the signal generator 19. As can be seen from FIG. 4, the illustrated part of the preferred motor drive system 16 is constructed using circuits that are readily available in integrated circuit form. In the particular motor drive system 16 illustrated, the various generators, comparators and flip-flop are constructed using operational amplifiers manufactured by National Semiconductor Corporation and identified by the device number LM 3900.

With respect to the circuit details of the illustrated preferred embodiment, the duration of the pulses 23 (FIG. 2) provided by the pulse generator 24 is determined by the time constant of the charging circuit for the capacitor 26. The charging circuit includes the resistor 95 and diode 96 serially connected between the output of operational amplifier 97 at line 29 and the capacitor 26 connected to the inverting input of the operational amplifier. For pulses 23 having the aforementioned width of 0.5 msec, a 270 ohm resistor 95 and a 2.2 microfarad capacitor 26 are used. For the hereinbefore specified pulse rate range of 0.5 Hz to 70 Hz, the wave speed potentiometer 28 is selected to a resistance that is adjustable from about 5 K ohm to 100 K ohm.

The triangular pulse generator 34 of the preferred embodiment includes an operational amplifier 98 and an integrating capacitor 99 coupled in circuit with the output of the operational amplifier 98 and the inverting input of the amplifier. For nominal triangular pulses of a duration of 14 msec having equal duration rise and fall times and an amplitude of about 3 volts, a 0.1 microfarad integrating capacitor 99 is used and a 100 K ohm resistor 100 is connected to the inverting terminal of the amplifier 98 and a 39 K ohm resistor 101 is connected to the non-inverting terminal.

As previously described, control of the amplitude and duration of the triangular pulses is provided, in part, by the adjustable vibration intensity potentiometer 41. In the preferred embodiment, the potentiometer 41 is adjustable over a range of about 82 K ohm to 1 M ohm. This range enables the amplitude of the triangular pulses to be varied in absence of modulation from zero to a maximum of about 3 volts with the duration varying from 0 to 14 msec.

With reference to the lefthand part of FIG. 4 illustrating an embodiment of the modulation function generator 18, the modulating signal 42 is provided by a triangular wave generator 59 that includes an operational amplifier 102 and integrating capacitor 103 coupled between the junction 100 at the output of the operational amplifier and the inverting input of the amplifier. For a modulating signal frequency range of 0.1 Hz to 15 Hz, a 10 microfarad integrating capacitor 103 and a wave length potentiometer 61 adjustable over a range of 0 ohm to 100 K ohm are used. To enable adjustment of the symmetry of the triangular wave modulating signal from a signal having a leading edge 25 times longer than the trailing edge of a signal having a trailing edge 25 times longer than the leading edge, the wave shape potentiometer 65 is selected to provide a resistance of about 1 M ohm. Furthermore, the potentiometer 65 is adjustable so that the resistance between the positive supply and the junction of the diodes coupled to the inverting and non-inverting inputs of the operational amplifier 102 cannot be reduced below about 16 K ohm.

In the particular embodiment of the modulation function generator 18 illustrated by FIG. 4, the comparator 66 includes a schmitt trigger circuit 104 followed by an inverting amplifier 105 that together provide the clamping signals to the input of the triangular wave generator 59 and the control signals to the inverter 73 and, hence, to pulse generator 68. An inverting amplifier 106 is coupled to the schmitt trigger 104 and provides the control signal to the pulse generator 68. The pulse generator 68 responsively causes truncation of the modulating signal 42 at the positive peaks because the capacitor 74 at the input of the pulse generator 68 is charged at the conclusion of the charging of the integrating capacitor 103 to delay the initiation of the generation of the falling trailing edge of the triangular wave 42 by the integrating capacitor 103. The delay results from the clamping of the input of triangular wave generator 59 by the output of the pulse generator 68 while the capacitor 74 is charging.

To produce the aforementioned range of delays between the rising edge and falling edge of the triangular wave modulating signal, namely 5 msec to about 15 seconds, a wave pause potentiometer 72 selected to provide a resistance that is adjustable from about 270 ohm to 1 M ohm and a 10 microfarad capacitor 74 are used to provide the desired delay.

The magnitude of the modulating signal generated by the modulation function generator 18 is controlled by the wave intensity potentiometer 79. In the preferred embodiment, the potentiometer 79 is adjustable over a range of about 82 K ohm to 1 M ohm. This range enables the amplitude and duration of the triangular pulses provided by the triangular pulse generator 34 to be modulated over a small range (when the potentiometer 79 is adjusted to insert the maximum resistance between junctions 39 and 69) and over a wide range (when the potentiometer 74 is adjusted to insert the minimum resistance between the junctions 39 and 69). With the wave intensity potentiometer 74 adjusted for the widest range of modulation, the amplitude of the triangular pulses will vary from a maximum to zero and back to the maximum as the triangular wave modulating signal gradually rises to a maximum and then gradually falls to a minimum.

In the timing control circuit 58, a schmitt trigger circuit 107 having the timing circuit 86 coupled to its inverting input forms the comparator 83. A 10 microfarad capacitor 92 and a 470 ohm resistor 93 form a timing circuit 86 that removes the high logic signal level from the output of the comparator 83 about 5 seconds after either the alarm switch 94 or timer switch 95 (see FIG. 2) is caused to connect the positive $V_1$ supply to the timing circuit 86. A diode 108 is also included in the timing circuit 86 to discharge the capacitor 92 between operations of the alarm or timer switches 94 and 95.

The comparator 82 includes a schmitt trigger 109 having an inverting input coupled to the output of the comparator 83 and the alarm switch 84.

The ramp generator 81 includes an operational amplifier 111, and a 470 microfarad integrating capacitor 112 coupled between the output and inverting input of the operational amplifier 111. A 470 K ohm resistor 114 is coupled between the positive $V_1$ supply and the inverting input of the amplifier 111 to discharge the capacitor 112 gradually when the alarm switch 84 is closed to hold the output of the schmitt trigger 109 at a low logic signal level. When the alarm switch 84 is open and the timer switch 85 (see FIG. 2) is closed, a high logic signal level is present at the output of the schmitt trigger 109. The high logic signal level enables the diode gate 115 to permit the capacitor 112 to rapidly discharge through the 1 K ohm resistor 116. The capacitor 112 is rapidly charged whenever the alarm switch 84 or timer switch 85 is closed because the output of schmitt trigger 107 goes to a high logic signal level.

The embodiment of the body massage apparatus 11 described with reference to FIGS. 1 through 4 is able to selectively administer differing massage effects to a person by controlling the vibration of a structure supporting the person. The differing effects are achievable because the controls are arranged to cooperate with each other to produce a greater number of massaging effects than can be produced by the individual controls. However, the controls do individually function so that some can be omitted if a less versatile massage apparatus is desired. Moreover, the massage apparatus 11 of the present invention is capable of administering differing massage effects by using only one vibrator motor 12.

While the invention has been described in detail in connection with a preferred embodiment thereof, it will be apparent to those skilled in the art that many changes or modifications can be made without departing from the spirit of the invention. It is therefore intended that the coverage afforded be limited only by the language of the claims and its equivalent.

I claim:

1. Apparatus for administering massage actions to a person in intimate contact with a structure comprising:

at least one vibrator motor adapted to be operatively connected to said structure to vibrate said structure in accordance with the waveform of a signal energizing said motor;

a pulse train generator controllable to generate a train of pulses of continually varying amplitude versus time relationship;

a function generator controllable to generate a modulating signal of varying amplitude versus time relationship different than that of said train of pulses and selected relative to said train of pulses to simulate therewith a traveling wave pattern, the frequency of said modulating signal being significantly lower than the frequency of said train of pulses;

a first coupling means for combining the modulating signal with the train of pulses to effect modulation of the amplitude versus time relationship of said pulses and thereby produce a modulated output signal simulative of a traveling wave pattern; and a second coupling means for operatively connecting said first coupling means directly to the vibrator motor to energize said vibrator motor with a signal having substantially the same shape as said modulated output signal.

2. Apparatus according to claim 1 wherein:

the pulse train generator includes a first control means for controlling the frequency of the pulses of the generated train of pulses; and the function generator includes a second control means for controlling the frequency of the modulating signal.

3. Apparatus according to claim 1 wherein the function generator includes:

a triangular pulse generator for generating a train of triangular pulses at an output for forming the modulating signal;

control means in circuit with the triangular pulse generator for controlling the amplitude, width and frequency of the triangular pulses of the generated train of triangular pulses coupled to the pulse train generator.

4. Apparatus according to claim 3 wherein the control means includes:

a frequency determining circuit coupled in circuit with the triangular pulse generator and adjustable to cause said triangular pulse generator to generate triangular pulses at the selected frequency.

5. Apparatus according to claim 4 wherein:

the triangular pulses have rising and falling edges; and the control means includes a timing circuit coupled in circuit with the triangular pulse generator and controllable to adjust differentially the rising and falling edges of the triangular pulses.

6. Apparatus according to claim 5 wherein the control means includes:

an adjustable second timing circuit coupled in circuit with the triangular pulse generator and responsive to each triangular pulse reaching a predetermined amplitude to cause said triangular pulse generator to provide a selected signal interval of constant amplitude at its output.

7. Apparatus according to claim 3 wherein the control means includes:

a signal amplitude control circuit coupled in circuit with the triangular pulse generator and controllable to adjust the amplitude of the modulating signal coupled to the pulse train generator.

8. Apparatus according to claim 1 further comprising:

timing control means coupled in circuit with the pulse train generator and the function generator and controllable to cause said pulse train generator and said function generator to energize the vibrator motor with a modulated train of pulses whose amplitude versus time relationship gradually changes for a selected interval determined by the timing control means.

9. Apparatus for administering massage actions to a person in intimate contact with a structure comprising:

at least one vibrator motor adapted to be operatively connected to said structure to vibrate said structure in accordance with the waveform of a signal energizing said motor;

a pulse train generator controllable to generate a train of pulses of selected amplitude versus time relationship;

a function generator controllable to generate a modulating signal of selected amplitude versus time relationship different than that of said train of pulses and selected relative to said train of pulses to simulate therewith a traveling wave pattern, said function generator including:

a second pulse train generator for generating a train of pulses having gradually rising and falling edges for forming the modulating signal; and a timing circuit in circuit with the second pulse generator and controllable to adjust differentially the durations of the rising and falling edges of the modulating signal pulses;

a first coupling means for combining the modulating signal with the train of pulses to effect modulation of the amplitude versus time relationship of said pulses and thereby produce a signal simulative of a traveling wave pattern; and a second coupling means for operatively connecting said first coupling means to the vibrator motor to energize said vibrator motor with a signal corresponding to said modulated train of pulses.

10. In apparatus for administering massage actions to a person; the combination comprising:

at least one vibrator motor coupled to vibrate in accordance with the waveform of a signal energizing said motor;

a trigger pulse generator controllable to generate a train of trigger pulses of a selected frequency;

a first pulse train generator controllable to generate a first train of pulses of selected first amplitude versus time relationship;

control circuit means coupled in circuit with the first pulse train generator for enabling the generation of the first train of pulses, said control circuit means including control input means having first and second terminals, said first terminal being coupled to the trigger pulse generator to receive the trigger pulses, said second terminal coupled to said first pulse trains generator to receive a signal indicative of the amplitude of the pulses generated by said first pulse train generator, said control circuit means responsive to trigger pulses to enable the generation of a pulse by said first pulse train generator when the signal level at said second terminal exceeds a reference signal level, and said control circuit means further responsive to said signal indicative of the amplitude of the pulse generated by said first pulse train generator exceeding a selected level to disable the generation of the pulse by said first pulse train generator;

a second pulse train generator controllable to generate a second train of pulses of selected second amplitude versus time relationship;

first coupling means for coupling the second train of pulses to said second terminal of said control input means to effect modulation of the reference signal level in accordance with the second amplitude versus time relationship of said second train of pulses; and second coupling means for furnishing a signal corresponding to the resulting train of pulses to the vibrator motor to energize the same.

11. Apparatus according to claim 10 wherein the trigger pulse generator includes a first control means for controlling the frequency of trigger pulses of the generated train of trigger pulses, and further comprising a reference signal level source coupled to said second terminal and adjustable to provide a selected reference signal at said second terminal.

12. Apparatus according to claim 11 wherein the second pulse train generator includes a second control means for controlling the frequency of pulses of the generated second train of pulses, and further comprising a signal amplitude control circuit coupled in circuit with said second pulse train generator and controllable to adjust the amplitude of pulses of the generated second train of pulses coupled to said second terminal.

13. Apparatus according to claim 12 wherein the second pulse train generator is controllable to generate a train of pulses having gradually rising and falling edges, and further comprising a timing circuit in circuit with said second pulse train generator and controllable to adjust differentially the durations of the rising and falling edges of the pulses generated by said second pulse train generator.

14. Apparatus according to claim 13 further comprising an adjustable timing circuit coupled in circuit with the second pulse train generator and responsive to each pulse of the generated second train of pulses reaching a predetermined amplitude to cause said second pulse train generator to provide a selected signal interval of constant amplitude.

15. Apparatus according to claim 14 further comprising:

timing control means coupled in circuit with said second terminal and second pulse train generator and controllable to cause the first and second pulse train generators to energize the vibrator motor with a train of pulses whose amplitude versus time relationship gradually changes for a selected interval.

16. Apparatus according to claim 10 wherein:

the control circuit means includes a flip-flop having first and second control inputs, said first input coupled to the trigger pulse generator and responsive to each trigger pulse to set the flip-flop in a first of its stable states, and second input coupled to said second terminal and responsive to the signal indicative of the amplitude of the pulse generated by the first pulse train generator to set the flip-flop in a second of its stable states when said amplitude of said pulse exceeds the selected level;

the first pulse train generator is a first bi-directional ramp generating circuit having an output and a ramp direction control input, the ramp direction control input coupled to the flip-flop and responsive to said flip-flop being in the first stable state to cause the signal at the output to change in a first direction, the output of the first bidirectional ramp generating circuit coupled to said second terminal, the first bi-directional ramp generating circuit responsive to the flip-flop being in the second stable state to cause the signal at the output to change in a second direction opposite to the first direction; and the second pulse train generator provides a train of pulses having gradually rising and falling edges.

17. Apparatus according to claim 14 wherein the second pulse train generator includes:

a second bi-directional ramp generating circuit having an output, a first control input and a second control input; and a comparator coupled in circuit with said output and having a first output coupled to the first control input of the second bi-directional ramp generating circuit and a second output coupled to the second control input of the second bi-directional ramp generating circuit, said comparator responsive to the signal at said output of the second bi-directional ramp generating circuit reaching a first level to cause the signal at said output of the second bi-directional ramp generating circuit to change in a first direction;

said comparator further responsive to the signal at said output of the second bi-directional ramp generating circuit reaching a second level to cause the signal at said output of the second bi-directional ramp generating circuit to change in a second direction opposite to the first direction.

18. Apparatus for administering massage actions to a person in intimate contact with a structure comprising:

a structure adapted to be in intimate contact with the body of a person;

at least one vibrator motor operatively connected to said structure to vibrate said structure in accordance with the waveform of a signal energizing said motor;

a pulse train generator controllable to generate a train of pulses of continually varying amplitude versus time relationship;

a function generator controllable to generate a modulating signal of varying amplitude versus time relationship different than that of said train of pulses and selected relative to said train of pulses to simulate therewith a traveling wave pattern, the frequency of said modulating signal being significantly lower than the frequency of said train of pulses;

a first coupling means for combining the modulating signal with the train of pulses to effect modulation of the amplitude versus time relationship of said pulses and thereby produce a modulated output signal simulative of a traveling wave pattern; and a second coupling means for coupling said first coupling means directly to the vibrator motor to energize said vibrator motor with a signal having substantially the same shape as said modulated output signal.

*19. Apparatus for administering massage actions to a person in intimate contact with a structure comprising:*

*at least first and second vibrator motors adapted to be operatively connected to said structure to vibrate said structure in accordance with the waveforms of signals energizing said motors;*

*at least first and second controllable motor drive systems connected respectively to said at least first and second vibrator motors for producing waveforms to energize said motors, each of said at least first and second controllable motor drive systems comprising*

*a pulse train generator controllable to generate a train of pulses of continually varying amplitude versus time relationship*

*a function generator controllable to generate a modulating signal of varying amplitude versus time relationship different than that of said train of pulses and selected relative to said train of pulses to simulate therewith a traveling wave pattern, the fre-*

*quency of said modulating signal being significantly lower than the frequency of said train of pulses*

*a first coupling means for combining the modulating signal with the train of pulses to effect modulation of the amplitude versus time relationship of said pulses and thereby produce a modulated output signal simulative of a traveling wave pattern, and*

*a second coupling means for operatively connecting said first coupling means directly to a vibrator motor to energize said vibrator motor with a signal having substantially the same shape as said modulated output signal.*

*20. Apparatus in accordance with claim 19 wherein said at least first and second controllable motor drive systems are configured to respectively produce different waveforms for energizing their associated motors, by controlling one of the pulse train generator and the function generator of one of said first and second controllable motor drive systems to be different in waveform with respect to the other.*

*21. Apparatus in accordance with claim 19 wherein said at least first and second controllable motor drive systems are configured to respectively produce different waveforms for energizing their associated motors, by controlling one of the pulse train generator and the function generator of one of said first and second controllable motor drive systems to be different in phase with respect to the other.*

*22. Apparatus in accordance with claim 19 including a structure adapted to be in intimate contact with the body of a person, and wherein said at least first and second vibrator motors are operatively connected to said structure.*

* * * * *